Dec. 15, 1942.   W. A. BLOCKER   2,305,059
ADJUSTING RULE
Filed Dec. 4, 1941

INVENTOR
WALTER A. BLOCKER
BY
Jones & Roe
ATTORNEYS.

Patented Dec. 15, 1942

2,305,059

UNITED STATES PATENT OFFICE 2,305,059

ADJUSTING RULE

Walter A. Blocker, Larchmont, N. Y.

Application December 4, 1941, Serial No. 421,689

7 Claims. (Cl. 33—200)

This invention pertains to adjusting rules for the use of the optician, optometrist and eye-physician (all hereafter called adjuster) whereby means are provided for definitely determining whether a pair of glasses when worn, are properly aligned, a condition conducive of eye-comfort.

Heretofore, methods and means of adjusting glasses to the eyes so that they are aligned with the pupils thereof have been wasteful of time and not positively accurate. The adjuster is prone to place the glasses on the wearer and, relying on visual accuracy and time-consuming dotting of the lenses, manipulate the bows and guards of the glasses to adjust them until the pupils of the eyes coincide as nearly as possible with the focal center of the lenses. This operation is at times not productive of an accurate result.

One object of my invention is to provide a relatively inexpensive, easily manufactured instrument which will enable the adjuster to expeditiously align a pair of spectacles with the pupils of the eyes of the wearer.

Another object is the provision of an adjusting rule which will fit any pair of glasses, regardless of size, style, type, or shape.

An additional object of the rule is to furnish means for almost instantaneous determination of proper alignment of the focal center of the lenses with the pupils.

A still further object is the provision of a readily manipulated instrument, suited for either a right or left handed adjuster, requiring a modicum of skill and finesse.

These and other objects will be apparent after a perusal of the specification and claims.

The drawing illustrates one embodiment of my rule.

Figure 1:
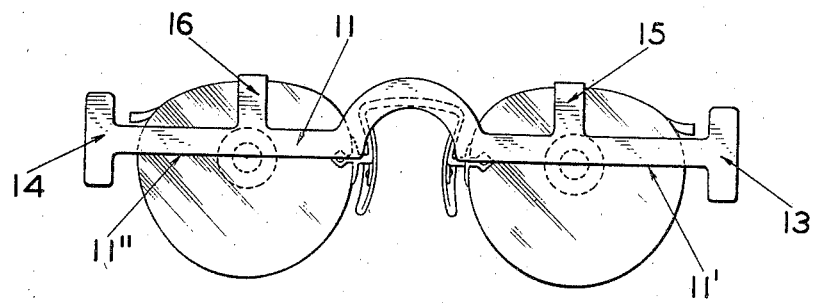
Fig. 1 shows a front view of the adjusting rule suspended from a pair of spectacles worn by a patient, with the lower edges of the base of the rule bisecting the pupils (constituting proper alignment of the spectacles).

In the drawing the numeral 10 denotes the rule generally, preferably struck from a sheet of metal having the attributes of longevity, flexibility and, preferably, featherweight. Any other suitable material may, however, be employed.

The rule comprises an elongated base 11 with straight lower edges 11$^1$ and 11$^2$ in the same plane. Medially of member 11 is formed arcuate shaped bridge 12 serving to accommodate the height of the bridge of the nose of the patient, when the rule is fitted on a pair of glasses.

At opposite ends of the base are provided duo ended handles 13 and 14, enabling the adjusting rule to be grasped by the adjuster with either the right or left hand, and further affording a choice of holding the top or bottom of the handles.

Figure 2:
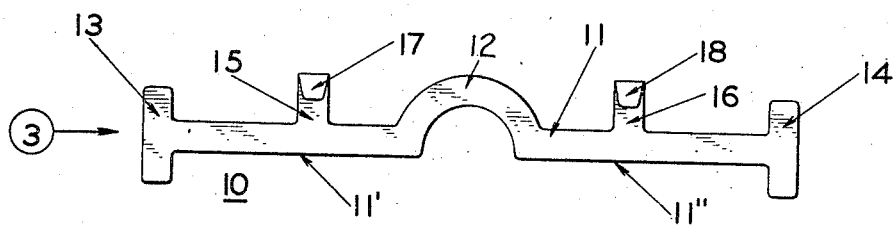
Fig. 2 illustrates a rear view of the adjusting rule.
Figure 3:
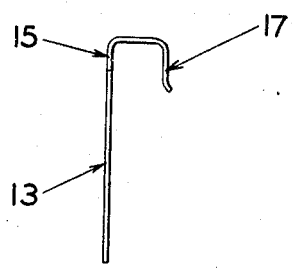
Fig. 3 is an enlarged end view.

At an equal distance inwardly from handles 13 and 14 are formed perpendicular members 15 and 16 (of equal length), the upper ends of which are bent to form hooks 17 and 18—see Fig. 2—the latter simple operation taking place after the rule is first struck from a blank of metal.

It can be readily seen from Fig. 1, which illustrates the adjusting rule positioned on a pair of glasses, that the adjuster, to align the pupils of the eyes with the focal center of the lenses, first suspends the rule from the tops of the rims, making sure that hooks 17 and 18 assume the position illustrated in Fig. 1. With, as shown, the straight lower edges 11$^1$ and 11$^2$ of base 11 in front of and contiguous the fronts of the lenses, two self adjusting rules (11$^1$ and 11$^2$) are provided, which are suspended equi-distantly from the top portions of the glass rims. The adjuster then sights along edges 11$^1$ and 11$^2$ and when said edges bisect the pupils of the eyes, the glasses are properly aligned and adjusted. If, when the rule is suspended from a pair of glasses, the latter require adjustment, manipulation of the glasses in the manner well known to the adjuster will readily change their position until edges 11$^1$ and 11$^2$ bisect the pupils of the eyes.

The time ordinarily consumed in adjusting and aligning a pair of glasses is greatly reduced. The patient is fitted to a nicety regardless of facial contour, the tilt of the head, or the manner in which the eyes may be set in the head.

I have devised my adjusting rule to fit over the rims of any pair of glasses without any adjustment of the rule, whether or not they be unusually shaped, so that the adjuster can carry the rule in his pocket or fitting table and be assured it will serve to align any pair of glasses on any patient. It requires not a single adjustment to be suspended or hung from any pair of spectacles.

The invention, as stated before, may be inexpensively manufactured from one piece of material. No parts need adjustment before the rule is fitted upon and in front of the lenses.

Hereinbefore the term glasses is intended to include spectacles, eyeglasses, oxfords, and any and all ophthalmic eyewear.

In the broader aspects, the invention comprehends the employment not only of the means described, but of equivalent means for performing the recited functions. It is desired to reserve the right to effect such changes as may come fairly within the scope of the appended claims.

I claim:

1. An adjusting rule for glasses comprising an elongated base member bridged at the center and having two straight lower edges in the same plane, handles formed at opposite ends of said member, the elongated member provided, on the edges opposite said lower edges and at points spaced inwardly equidistantly from the handles, with a pair of members of the same length as each other, extending perpendicularly therefrom and having hooks at their outer ends.

2. An adjusting rule for glasses comprising an elongated base divided by a bridge into two portions having their lower edges in the same plane, handles formed at opposite ends of said base, and means for suspending said rule from a pair of eye-glasses.

3. A device of the character described consisting of a base bridged at the center, portions extending outwardly in the same plane from the bridge, handles at opposite ends of said base, and means for suspending said rule in front of a pair of glasses, said portions adapted to lie contiguous the lenses of the glasses.

4. An adjusting rule for aligning spectacles comprising a base divided by an arcuate shaped bridge into two portions having their lower edges in the same plane, the base provided on the edges opposite said lower edges, at points spaced inwardly equidistantly from the ends of the base, with a pair of members of the same length as each other, extending perpendicularly therefrom, and having hooks provided at the outer extremities of said members, said bridge adapted to accommodate the height of the bridge of the nose when the rule is suspended in front of a pair of glasses.

5. An adjusting rule for the purpose described comprising a base recessed in the center, handles at opposite ends of the base, the base provided on the edge thereof opposite the recess, at points spaced inwardly equidistantly from the handles, with a pair of members of the same length as each other, extending perpendicularly therefrom and provided with hooks at their outer ends.

6. An adjusting rule for glasses comprising an elongated base member bridged at the center and having two straight lower edges in the same plane, the elongated base member provided on the edges opposite said lower edges and at points spaced inwardly equidistantly from the handles with a pair of members of the same length as each other, extending perpendicularly therefrom and having hooks at their outer ends, the straight lower edges adapted to serve as aligning means for the purpose specified when the rule is suspended in front of the glasses.

7. An adjusting rule for use in combination with a pair of glasses comprising a base divided at its center portion by a bridge into two laterally extending portions of uniform dimension having straight lower edges in the same plane, duo ended handles at opposite ends of the base, two members of the same length spaced inwardly equidistantly from opposite ends of the base and extending perpendicularly from the edges of the base opposite the said lower edges, having hooks at their outer ends adapted to engage the upper rims of the glasses.

WALTER A. BLOCKER.